United States Patent
Clausen

(10) Patent No.: US 10,451,423 B1
(45) Date of Patent: Oct. 22, 2019

(54) MOBILE MAPPING AND NAVIGATION

(71) Applicant: Cartogram Inc., Bellevue, WA (US)

(72) Inventor: William Stryker Clausen, Kirkland, WA (US)

(73) Assignee: Cartogram Inc., Bellevue, WA (US)

( * ) Notice: Subject to any disclaimer, the term of this patent is extended or adjusted under 35 U.S.C. 154(b) by 0 days.

(21) Appl. No.: 16/174,116

(22) Filed: Oct. 29, 2018

Related U.S. Application Data

(63) Continuation of application No. 16/105,629, filed on Aug. 20, 2018.

(51) Int. Cl.
| | | |
|---|---|---|
| *G01C 21/20* | (2006.01) | |
| *G01C 21/00* | (2006.01) | |
| *G06F 16/29* | (2019.01) | |

(52) U.S. Cl.
CPC ......... *G01C 21/206* (2013.01); *G01C 21/005* (2013.01); *G06F 16/29* (2019.01)

(58) Field of Classification Search
CPC .................................................... G01C 21/206
See application file for complete search history.

(56) References Cited

U.S. PATENT DOCUMENTS

| | | | |
|---|---|---|---|
| 8,930,134 B2 * | 1/2015 | Gu .................... | G06Q 30/0205 |
| | | | 701/434 |
| 9,068,846 B1 * | 6/2015 | Boerger ............... | G01C 21/206 |
| 10,156,446 B2 * | 12/2018 | Liu .................... | G06Q 30/0259 |

* cited by examiner

*Primary Examiner* — Todd M Melton
(74) *Attorney, Agent, or Firm* — HM2 TECHNOLOGY LAW GROUP LLP

(57) ABSTRACT

Systems and methods for mapping and navigation are provided. In implementations, the systems and methods perform operations including receiving, via a network, a message from a messaging application of a mobile device of a user requesting a map of a mapped area. The operations also include generating the map of the mapped area displaying an icon indicating a location of the user. Further, the operations include sending, via the network, the map to the messaging application of the mobile device.

22 Claims, 9 Drawing Sheets

| 900 | 905 | 909 | 913 | 917 | 355 |
|---|---|---|---|---|---|
| | AP ID | AP LOC | SIGN ID | SIGN LOC | |
| | 00001 | | | | |
| | 00002 | | | | |
| | ... | | | | |
| | 0000n | | | | |

FIG. 9

| 1000 | 1005 | 1009 | 1013 | 1017 | 357 |
|---|---|---|---|---|---|
| | DEST NAME | DEST LOC | WAP 1 | WAP 2 | |
| | CAFETERIA | | | | |
| | LAB 1215 | | | | |
| | ... | | | | |
| | DR SMITH OFFICE | | | | |

FIG. 10

MOBILE MAPPING AND NAVIGATION

CROSS-REFERENCE TO RELATED APPLICATIONS

This application is a continuation and claims priority to U.S. patent application Ser. No. 16/105,629 filed Aug. 20, 2018, the disclosure of which is hereby incorporated herein by reference in its entirety.

BACKGROUND

Current mapping and navigation services for mobile devices (e.g., smartphones) can give real-time directions using dedicated mapping applications. Such mapping and navigation services may combine map information from a number of publicly-accessible sources, such as satellite imagery, aerial imagery, street maps, panoramic street views, public transportation system, and routing services, and business listing services. For example, the panoramic views can be obtained by cameras mounted to vehicles driven on public roads. Some mapping and navigation services may also provide indoor map of public places, such as airports and shopping malls. However, private areas are generally not open to collection of mapping data by commercial mapping and navigation services. For example, commercial mapping and navigation services may not be permitted access to the interiors of private properties (e.g., hospitals) to obtain map information. Hence, such mapping and navigation services may not be available to an individual who visits a private property. And, even if mapping and navigation services are provided by the private property, the individual's mobile device may lack a corresponding mapping application used to access the mapping service offered by the private property. In some situations, the mobile device may be a feature phone (e.g., a flip-phone) that lacks any capability to download or execute the mapping application. In other situations, the user may be unable to obtain the mapping application. For example, downloading applications may not be permitted by the terms of the individual's cellular telephone service. Therefore, a need exists for a system and method for providing mapping and navigation services to individuals whose mobile devices lack a mapping application used to navigate such non-public areas.

SUMMARY

Systems and methods for mapping and navigation are provided. In implementations, the systems and methods perform operations including receiving, via a network, a message from a messaging application of a mobile device of a user requesting a map of a mapped area. The operations also include generating the map of the mapped area displaying an icon indicating a location of the user. Further, the operations include sending, via the network, the map to the messaging application of the mobile device.

DRAWINGS

The present invention will become more fully understood from the detailed description and the accompanying drawings, wherein:

FIG. 9 shows table illustrating an example of a data structure in accordance with aspects of the present disclosure.

FIG. 10 shows table illustrating an example of a data structure in accordance with aspects of the present disclosure.

DETAILED DESCRIPTION

The present disclosure is generally directed to mapping and navigation systems and methods. More specifically, implementations of systems and methods consistent with the present disclosure can determine location and routing information of a user of a mobile device without any mapping and navigation application being installed on the mobile device. For example, the location and routing information can be provided using a text messaging application (e.g., short message service (SMS) or multimedia messaging service (MMS)) or a chat application. Further, in some implementations, the systems and methods provide the location and routing information using a chatbot that monitors messaging or chat applications for messages that indicate that a user desires location and routing information, and automatically responds to such messages by interacting with the user to provide the location and routing information. Additionally, in some implementations, the mapping and navigation systems and methods determine the current location of the user based on communication between the user's mobile device and one or more network nodes. For example, based on the signal strength of Wi-Fi signals between the mobile device and different wireless access points distributed around an area (e.g., a building interior), methods and systems disclosed herein can determine the location of the user with respect to the wireless access points and update such location as the user moves through the building with the wireless device.

Reference will now be made in detail to specific implementations illustrated in the accompanying drawing. In the following detailed description, numerous specific details are set forth to provide a thorough understanding of the invention. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

Figure 1:
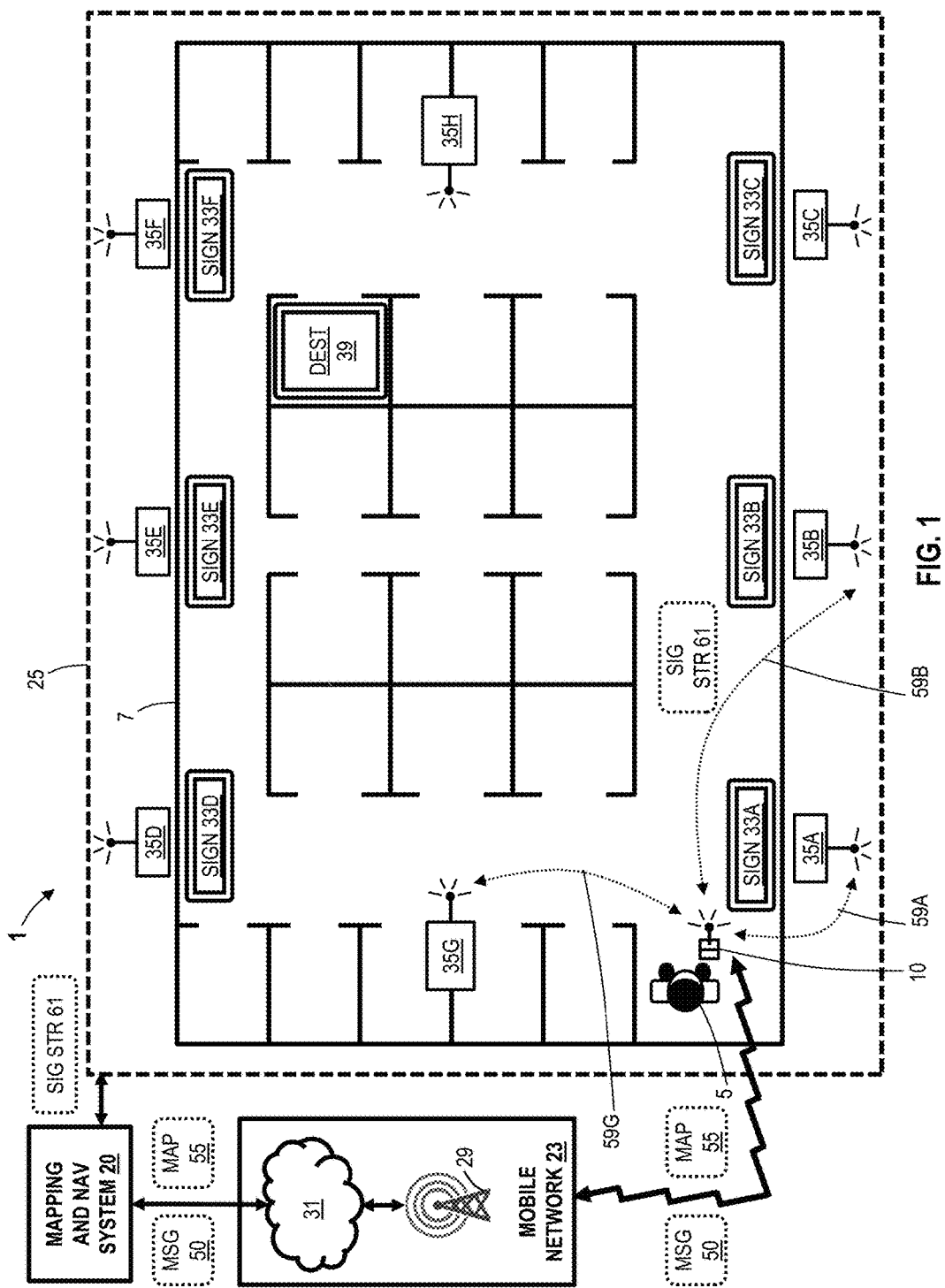
FIG. 1 shows a system block diagram illustrating an example of an environment for implementing systems and processes in accordance with aspects of the present disclosure.

FIG. 1 shows a block diagram illustrating an example of an environment 1 for implementing systems and processes in accordance with aspects of the present disclosure. The environment 1 can include a user 5, a mapped area 7, a mobile device 10 of the user 5, a mapping and navigation system 20, a mobile network 23, and a wireless network 25. The user 5 can be an individual that desires location or routing information for the mapped area 7. For the example, the user 5 can be a visitor to the mapped area 7. The mapped area 7 can be a region (e.g., an area or a volume) for which map and spatial data has been pre-stored by the mapping and navigation system 20. The mapped area can be, for example, region of land (e.g., a park) or a space within a building. In some implementations, the mapped area can be a region that limits accesses to the public (physically and/or legally), such as a non-public park or building.

In accordance with implementations of the present disclosure, the mapped area 7 can include signs 33 and wireless access points 35 at different locations around the mapped area 7. The signs 33A can be physical signage (e.g., a static or dynamic billboard) that conveys location information and directions. The signs 33A, 33B, 33C, 33D, 33E, 33F (collectively "signs 33") can include respective identifying information uniquely identifying the individual signs 33A, 33B, 33C, 33D, 33E, 33F. In some implementations, the identifying information can be alphanumeric text that can be read by the user 5 and entered into the mobile device 10 (e.g., using a keypad or dictation). In some embodiments, the identifying information can be computer-readable codes (e.g., barcode or QR code) that can be captured by a sensor (e.g., camera) of the mobile device 10. In some embodiments, the signs 33 can provide computer-readable information identifying the individual signs 33A, 33B, 33C, 33D, 33E, and 33F via a short-range communication (e.g., radio-frequency identification (RFID), low-energy BLUETOOOTH, or passive Wi-Fi). Additionally, the signs 33 can include contact information for communicating to with the mapping and navigation system 20 using a messaging application (e.g., "Text #333 to Obtain Your Location and Directions").

The wireless access points (WAPs) 35A, 35B, 35C, 35D, 35E, and 35F (collectively "wireless access points 35") can be nodes of the wireless network 25. For example, for some implementations in which the mapped area 7 is inside a building, the wireless access points 35 can be part of local area network, such as nodes of a Wi-Fi network. For some implementations in which the mapped area 7 is a large parkland, the wireless access points 35 can be nodes of a cellular telephone network (e.g., cell site or cell tower of a Global System for Mobile Communication (GSM) network). Some or all of the wireless access points 35A, 35B, 35C, 35D, 35E, and 35F can be associated with respective ones of the signs 33A, 33B, 33C, 33D, 33E, and 33F. For example, the sign 33A can be located proximate (e.g., within 10 meters) to the wireless access point 35A and may be placed in the sight line of the user 5 (e.g. between 2-3 meters high). In some implementations, the wireless access points 35 can be combined with, attached directly to, or integrated into the signs 33. Further, in some implementations the signs 33 and/or the wireless access points can incorporate other tracking systems, such as proximity detectors (e.g. BLUETOOTH proximity detectors), or imaging devices (e.g., image tracking and facial recognition cameras).

The mobile device 10 can be a portable computing system. In some implementations, the mobile device 10 can be a user device providing a computer-user interface (e.g., a graphic user interface) with which the user 5 can interact with a messaging application to send and receive messages to other individuals and services, including the mapping and navigation system 20. In various implementations, the mobile device 10 can be a laptop computer system (e.g., a notebook computer), a handheld computing device (e.g., a smartphone), or a wearable device (e.g., a smartwatch), other portable user device that executes a messaging application (e.g. a messaging client) and which can communicatively connect (directly or indirectly) to the mapping and navigation system 20 via the mobile network 23 and the wireless network 25. In some implementations, the mobile device 10 can be an autonomous system, such as a mobile robot. In accordance with aspects of the present disclosure, the mobile device 10 may lack any installed mapping or navigation application (e.g., GOOGLE MAPS, APPLE MAPS, BING MAPS, HERE MAP, WIKIMAPIA MAP, MAPQUEST MAP, TOMTOM MAP, WAZE MAP, and YANDEX MAP.) The mobile device 10 may or may also lack a mapping application which leverages software development tools that enable developers to embed functionality from common mapping applications (e.g., those listed in the previous sentence). Instead, the mobile device 10 may can include a SMS application, a MMS application, a chat application, or other such messaging applications (e.g., APPLE MESSAGES, FACEBOOK MESSENGER, YAHOO! MESSENGER, TRILLIAN, ADIUM, and WHATSAPP).

The mapping and navigation system 20 can be one or more computing devices communicatively linked to the mobile device 10 through the mobile network 23 and/or the wireless network 25, and which provides location and routing services to the user 5. In implementations, the mapping and navigation system 20 can be provided by an owner or operator of the mapped area 7. As detailed herein below, the mapping and navigation system 20 can include one or more computers that host map information, generate maps of the mapped area 7, and communicate the maps to the mobile device 10.

The mobile network 23 can be, for example, a wideband or broadband cellular network, which is communicatively coupled to mobile device 10 and the access points 35 though wireless network 25. The wireless network 25 can be a wireless communication network that can be communicatively coupled to the mobile device 10, the mapping and navigation system 20, and the wireless access points 35. In some implementations, the wireless network 25 can be a wide area network or a local area network. For example, the wireless network can be a Wi-Fi network or the like. The mobile device 10 and the mapping and navigation system 20 can communicatively exchange information through the mobile network 23 and the wireless network 25. For example, the mobile device 10 can wirelessly transmit messages for the mapping and navigation system 20 through a cellular phone network 29, which can pass the messages to the mapping and navigation system 20 through a wide area network 31 (e.g., the Internet).

In an example consistent with some implementations of the present disclosure, the user 5 carrying the mobile device 10 in the mapped area 7 may desire directions to a location, such as destination 39 of the mapped area 7. In the present example, the mapped area 7 can be a hospital and the destination can be a particular room, such as an office, a laboratory, a clinic, or a cafeteria, etc.) within the hospital. In accordance with aspects of the present disclosure, the mobile device 10 may lack any mapping and navigation application for the hospital, or there may be no commercial service offering mapping and navigation information inside the hospital. For example, the mobile device may be a feature phone lacking any mapping or navigation application. Instead, in accordance with aspects of the present disclosure, the user 5 can obtain location and routing information from the mapping and navigation system 20 using a messaging application executed by the mobile device 10. More specifically, the user 5 can use the messaging application to send a message 50 to the mapping and navigation system 20 through the mobile network 23 or the wireless network 25. The message 50 can include identification information of the mobile device 10 (e.g., a MAC address) and identification information of the sign 33A closest to the user 5 and can constitute a request for location and routing information to the destination 39. In some cases, the user 5 can obtain contact information (e.g., a telephone number or code) of the mapping and navigation system 20 and the identification information of the sign 33A by reading the sign 33A, and manually inputting such information into the messaging application. In some implementations, the user 5 can obtain the contact information of the mapping and navigation system 20 and identification information of the sign 33A wirelessly using sensors on the mobile device (e.g., camera or RFID reader). Additionally, in some implementations, the wireless access points 35 can be intelligent beacons that automatically detect the proximity of the mobile device 10 and cause the messaging application to display message through a user interface of the mobile device 10 asking the user 5 to indicate whether the user 5 would like to request location and routing information.

Together with the request message 50, or in one or more follow-up messages 50, the user can provide information to the mapping and navigation system 20 identifying their desired destination, such as destination 39. For instance, in response to offering the location and routing information, the user may reply, "I need directions to the cafeteria." Using information extracted in the one or more messages 50 (e.g., using natural language processing), the mapping and navigation system 20 can determine contact information for the mobile device 10, the location identifier of the sign 33A, and the location of the destination 39.

Further, in some implementations, the wireless access points 35 can determine signal strengths of wireless signals 59A, 59B, and 59G (collectively wireless signals 59) communicated between the mobile device 10 and the wireless access points to determine respective distances between the mobile devices and the wireless access points. The wireless signals 59 can be, for example, probe requests transmitted (e.g., broadcast) by the mobile device 10 when attempting to select one of the wireless access points 35 for establishing a connection with the wireless network 25 (e.g. a Wi-Fi probe request). In response to receiving such probe requests (e.g., a Wi-Fi probe responses), the wireless access points 35 in range of the mobile device 10's transmission may determine respective signal strengths 61 and can provide such information to the mobile device 10. Using the received signal strengths, the mobile device 10 or the mapping and navigation system 20 can passively track the location of the user 5 as the user 5 navigates moves through the hospital to the destination 39. In some implementations, the signal strengths can be sent from the mobile device 10 to the mapping and navigation system 20, and in some implementations, the signal strengths 61 can be sent directly from the wireless access points 35 to the mapping and navigation system through the wireless network 25 in association with a unique identifier of the mobile device 10 (e.g., a MAC address). In some implementations, the mapping and navigation system 20 can also passively track the location of the user 5 by facial recognition using cameras in the mapped area 7.

Using the information obtained from the message 50 and the signal strengths 61, the mapping and navigation system 20 can generate a mapping information 55 and send a message including the mapping information 55 to the messaging application of the mobile device 10 via the wireless network 25 and/or the mobile network 23. The mapping information 55 can indicate (e.g., semantically and visually) the location of the mobile device 10 at a position at or near the sign 33A and a route from the location of the user 5 to the destination 39. As the mobile device 10 moves through the hospital, the mapping and navigation system 20 can automatically determine the location of the mobile device 10 with respect to the different wireless access points 35 and send updated maps 55 to the messaging application of the mobile device 10 showing the mobile device's 10 current position and route to the destination 39. Such updates may be provided by sending and receiving messages via a SMS, an MMS, or a chat application.

Figure 2:
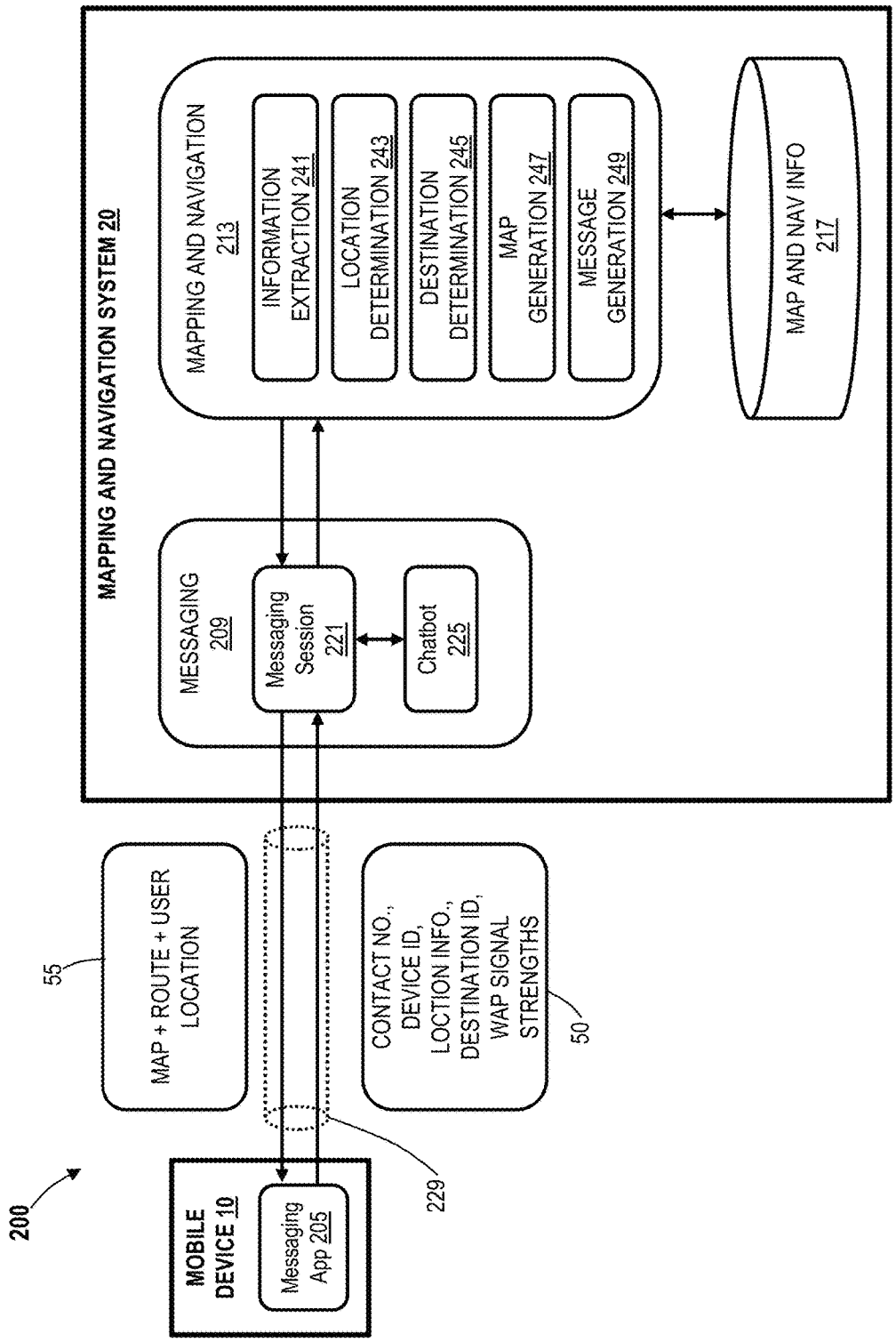
FIG. 2 shows a block diagram illustrating an example of a mapping system communicating with a mobile device in accordance with aspects of the present disclosure.

FIG. 2 shows a functional block diagram illustrating a system 200 that provides location and routing information, in accordance with aspects of the present disclosure. The system 200 can include a mobile device 10 and mapping and navigation system 20, which can be the same or similar to those previously described previously. The mobile device 10 can be a portable computer, such as a smartphone, laptop computer, or similar device including wireless communication means (e.g., GSM modem, Bluetooth, RFID, infrared), a display device (e.g., a liquid crystal display or light-emitting diode display), and a data input device (e.g., keyboard for text entry and microphone for dictation). The mobile device 10 can also include hardware, software, or a combination thereof for detecting the location and movement (e.g., Global Positioning System (GPS) and accelerometers for performing inertial guidance and step detection). Further, the mobile device 10 can include a messaging application 205. The messaging application 205 can be, for example, a text messaging application (e.g., a SMS client), a multimedia messaging application (e.g., an MMS client), or a chat application (e.g., FACEBOOK MESSENGER). In accordance with aspects of the present disclosure, the messaging application 205 may lack any mapping and navigation functionality. For example, the mobile device 10 can lack any mapping and navigation application or any interface capable of obtaining location and routing information from the mapping and navigation system 20 or capable of generating a map based on information provided by the mapping and navigation system 20. That is, while the mobile device 10 can include a mapping and navigation application (e.g., GOOGLE MAPS) such application may not be compatible with or have access to the mapping and navigation system 20. In some implementations, the messaging application 205 can be a pure SMS, MMS, or chat application the solely functions to create, send, and receive text or multimedia messages (e.g., message 50).

The mapping and navigation system 20 can include a messaging module 209, a mapping and navigation module 213, and mapping and navigation information 217. The messaging module 209 can be software, hardware, or a combination thereof that provides one or more messaging sessions between the mapping and navigation system 20 and the mobile device 10. For example, the messaging module 209 can provide a messaging session 221 (e.g., text messages) through which a user (e.g., user 5) of the mobile device 10 communicates with the mapping and navigation system 20 via a messaging application 205 executed by the mobile device 10. The mapping and navigation system 20 can receive one or more messages 50 from the mobile device 10 and provide one or more maps 55 to the mobile device 10 using a communication link 229. The messages 50 and maps 55 can be the same or similar to those describe previously. The communication link 229 can be wireless connection established between the mobile device 10 and the mapping and navigation system 20 through one or more communication networks (e.g., mobile network 23 and wireless network 25).

In implementations, the messaging module 209 can execute the program code of a chatbot 225, which can be software, hardware, or combination thereof configured to monitor the messaging session 221, automatically detect messages 50 including terminology indicating a request for location and routing information in the messaging session 221, and interactively respond to such requests though the messaging session 221. The chatbot 225 can use logical rules and/or heuristic rules to determine and select questions for eliciting the information needed to generate the mapping information 55. In implementations, the chatbot 225 can use natural language processing to hold conversations (via text and/or speech) with users of the mobile device 10 (e.g., IBM WATSON™ by INTERNATIONAL BUSINESS MACHINES INC., of Armonk, N.Y., and natural language processing by OPENAI.COM). The natural language processing performed by the chatbot 225 can be adapted to interpret conversations in the context of locations and routing. In implementations, the conversation can be carried out entirely via text, entirely via speech, or using a combination of text, speech, and other computer-user interfaces. For example, the chatbot 225 can monitor the messaging session 221 for a predefined keywords or combinations of such keywords. The predefined keywords or combinations thereof may trigger the chatbot 225 to intervene in the messaging session 221 and begin conversing with the user in the messaging session 221 to obtain a complete set of information for generating the mapping information 55. For example, various predetermined combinations of words may indicate that the user needs assistance in requesting location information or routing information. The messaging module 209 may receive a message from the mobile device 10 including a natural language query, such as, "I need directions." By monitoring the messaging session 221, the chatbot 225 can be triggered to start a conversation with the user (e.g., "What is your destination?"). Subsequently, the chatbot 225 can interactively engage in conversation with the user 5 in the messaging session 221 to obtain the user's current location (e.g., near sign 33A) and the user's destination (e.g., destination 39).

The mapping and navigation module 213 can be software, hardware, or a combination thereof that generates the mapping information 55 based information obtained from the user in the one or more messages 50 and/or by the chatbot 225. The mapping and navigation module 213 can include a number of functional modules, including an information extraction module 241, a location determination module 243, a destination determination module 245, a map generation module 247, and a message generation module 249. While these modules are described as separate for the sake of explanation, it is understood that the functionality of some or all of the modules can be combined or subdivided.

The information extraction module 241 may be configured to parse information received in the one or more messages 50 to extract the information including the contact information for the mobile device 10 (e.g., user ID, telephone number, and email address), a device identifier (e.g., a MAC address), the location information of the mobile device (e.g., predetermined identifying information of sign 33A), and destination information (e.g., text or code identifying a destination 39). Additionally, the messages 50 can include signal strength information for one or more wireless access points (e.g., wireless access points 35A, 35B, and 35E), which can be used to determine a current location of the user.

The location determination module 243 can be configured to determine the current location of the mobile device 10 based on the location information obtained from the chatbot 225 or the information extraction module 241. For example, the location information may indicate that the user is near a particular sign (e.g., sign 33A) in an area (e.g., mapped area 7). As discussed previously, the sign can be proximate to (e.g., within five yards) and associated with a particular wireless access point (e.g., wireless access point 35A) a predetermined location. Such associations and locations can be stored and retrieved from the mapping and navigation information 217. Thus, based on the location information of the sign received from the mobile device 10, the location determination module 243 can determine the location of the user. Additionally, the location determination module 243 can track the mobile device 10 and update the location as the user moves through the area. For example, the location determination module 243 can estimate the user's current location based on the signal strengths (e.g., signal strengths 61) of wireless transmissions (e.g., wireless signals 59, such as probe requests) sent by the mobile device 10 to different wireless access points (e.g., wireless access points 35) whose respective locations are pre-stored by the mapping and navigation system 20. (See FIG. 9.)

The destination determination module 245 can be configured to determine a location of the destination. In some implementations a destination identifier can be obtained from the chatbot 225 and the information extraction module 241. In some implementations, the destination identifier be obtained from pre-stored user information (e.g., appointment information in a calendar of the user). Using the destination identifier, the destination determination module 245 can reference destination information stored in the mapping and navigation information 217 to identify a particular location (e.g., coordinates) corresponding to a name of a destination (e.g., "cafeteria"). (See FIG. 10.)

The map generation module 247 can be configured to determine a route between the location of the mobile device determined by the location determination module 243 and the location of the destination determined by the destination determination module 245. Additionally, the map generation module 247 can be configured to render a map including the current location of the user, the location of the destination, and the route therebetween on a map stored by the mapping and navigation information 217. For example, the map generation module 247 may generate the mapping information 55 by retrieving a copy of a map of the mapped area and overlay icons or other graphics indicating the current location, the destination location, and the route on the retrieved map. (See FIGS. 6-8.)

The message generation module 249 can be configured to generate a message for the messaging module 209 for providing the mapping information 55 to the user. The message can include the mapping information 55 generated by the map generation module 247 and can be sent to the contact number of the mobile device 10 extracted by the information extraction module 241.

Figure 3:
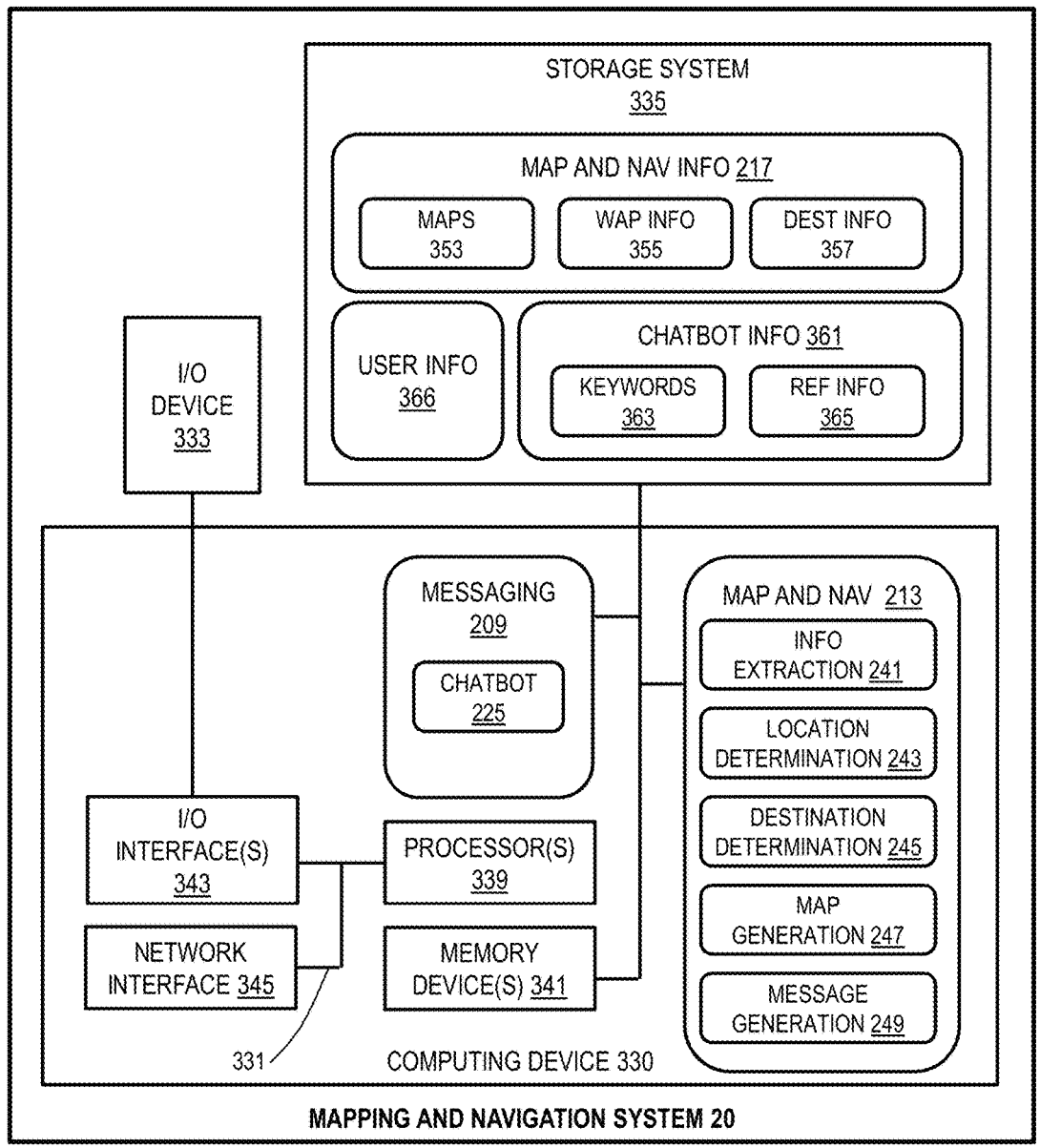
FIG. 3 shows a flow block diagram illustrating an example of a process in accordance with aspects of the present disclosure.

FIG. 3 shows a system block diagram illustrating an example of a mapping and navigation system 20, which can be the same or similar to that described above. The mapping and navigation system 20 includes hardware and software that perform the processes and functions disclosed herein. The mapping and navigation system 20 includes a computing device 330, an input/output (I/O) device 333, and a storage system 335. The I/O device 333 can include any device that enables an individual to interact with the computing device 330 (e.g., a user interface) and/or any device that enables the computing device 330 to communicate with one or more other computing devices using any type of communications link. The I/O device 333 can be, for example, a touchscreen display, pointer device, keyboard, etc. The I/O device 333 and the network interface can, for example, provide a wired or wireless data connection (e.g., communication link 229).

The storage system 335 can comprise a computer-readable, non-volatile hardware storage device that stores information and program instructions. For example, the storage system 335 can be one or more flash drives and/or hard disk drives. In accordance with aspects of the present disclosure, the storage system 335 can store maps 353, wireless access point information 355, and destination information 357. The maps 353 can include location and navigation information of area (e.g., mapped area 7). The wireless access point information 355 can associate identification information of signage in the mapped location (e.g., signs 33) with coordinates of locations corresponding wireless access points (e.g., wireless access points 35) in the mapped area. (See, e.g., FIG. 9.) The destination information 357 can associate identification information of destinations (e.g., destination 39) in the mapped area with coordinates of particular destinations in the mapped area and with coordinates of nearby wireless access points. (See, e.g., FIG. 10.)

Additionally, the storage system 335 can store chatbot information 361 that can be referenced by the chatbot 225. The chatbot information 361 can include keywords 363 and reference information 365. The keywords 363 can include predefined words used in a bag-of-words model for natural language processing. The reference information 365 can include rules, heuristics, and other logic for interpreting the content of messages (e.g., message 50). Additionally, the reference information 365 can include templates for use by the chatbot in generating questions and other messages to interact with the user.

Further, the storage system 335 can store user information 366. The user information 366 can be, for example, user profile information, facial recognition information, demographic information, health information, account information, and mobile device information. The user information 366 can be stored and retrieved by referencing a user identifier (e.g., a name of the user or a reference number of the user), a mobile device identifier (e.g., a MAC address), or facial recognition information. The user identifier can be obtained from a message sent by the mobile device (e.g., in message 50). The facial recognition information can be obtained from a camera included in the mobile device or cameras located in the mapped area (e.g., incorporated in and around signs 33 and wireless access points 35). The user information 366 can be obtained and stored locally in the mapping and navigation system 20. Additionally or alternatively, the user information 366 can be generated and stored outside the mapping and navigation system 20. In some implementations, the user information 366 can reference a calendar or appointment information of the user. In such implementations, the destination determination module 245 can access the calendar or appointment information and automatically determine the destination (e.g., destination 39). For example, the user information 366 can store links to records maintained by an electronic health records service, which may include times, dates and locations of users' medical appointments. Based on such information, as well as the current time and data, the destination determination module 245 can predict the users' destinations without receiving any destination input from a user or a mobile device.

In embodiments, the computing device 330 includes one or more processors 339 (e.g., microprocessor, microchip, or application-specific integrated circuit), one or more memory devices 341 (e.g., RAM and ROM), one or more I/O interfaces 343, and one or more network interfaces 345. The memory device 341 can include a local memory (e.g., a random-access memory and a cache memory) employed during execution of program instructions. Additionally, the computing device 330 includes at least one communication channel 331 (e.g., a data bus) by which it communicates with the I/O device 333 and the storage system 335. The processor 339 executes computer program instructions (e.g., an operating system and/or application programs), which can be stored in the memory device 341 and/or storage system 335. The processor 339 can also execute computer program instructions of a messaging module 209 and a mapping and navigation module 213, which can be the same or similar to those described previously herein. Moreover, the messaging module 209 can include a chatbot 225, which can be the same or similar to that described previously herein. Further, the mapping and navigation module 213 can include an information extraction module 241, a location determination module 243, a destination determination module 245, a map generation module 247, and a message generation module 249, all of which can be the same or similar to those described previously herein.

It is noted that the computing device 330 can comprise any general-purpose computing article of manufacture capable of executing computer program instructions installed thereon (e.g., a personal computer, server, etc.). However, the computing device 330 is only representative of various possible equivalent-computing devices that can perform the processes described herein. To this extent, in embodiments, the functionality provided by the computing device 330 can be any combination of general and/or specific purpose hardware and/or computer program instructions. In each embodiment, the program instructions and hardware can be created using standard programming and engineering techniques, respectively.

Figure 4:
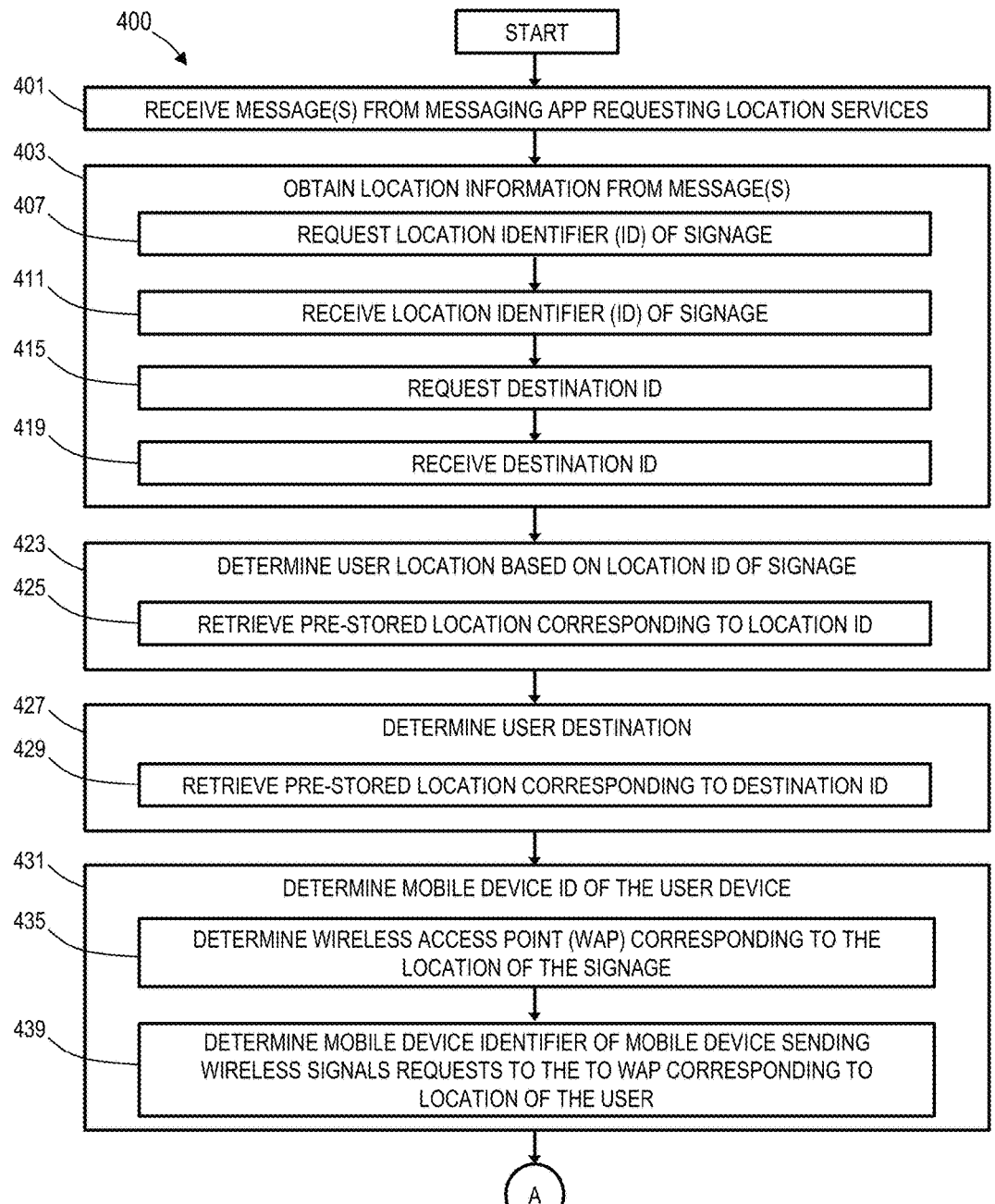
FIG. 4 shows a flow block diagram illustrating an example of a process in accordance with aspects of the present disclosure.
Figure 5:
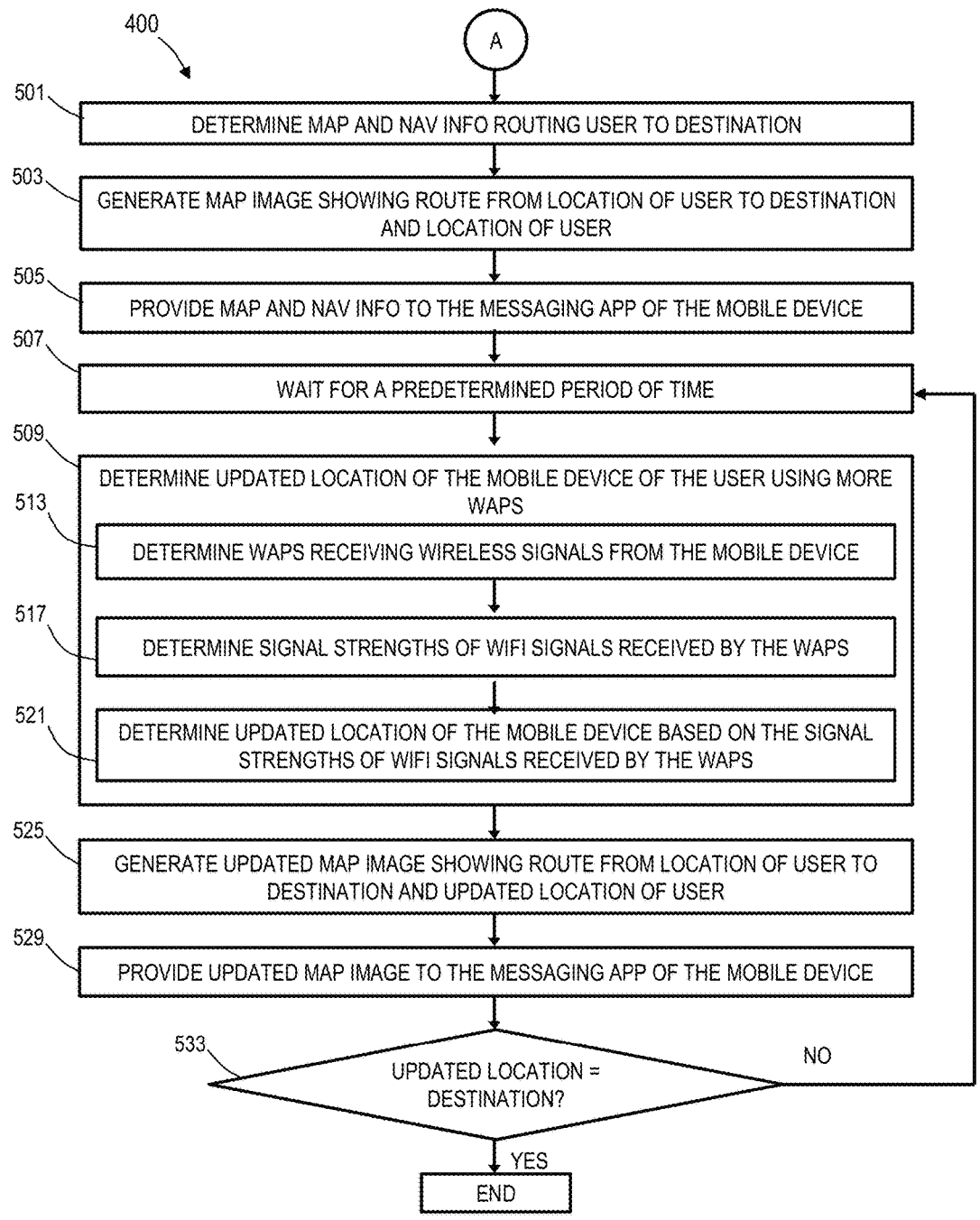
FIG. 5 shows a flow block diagram illustrating an example of a process in accordance with aspects of the present disclosure.

The flow diagrams in FIGS. 4 and 5 illustrate examples of the functionality and operation of possible implementations of systems, methods, and computer program products according to various implementations consistent with the present disclosure. Each block in the flow diagrams of FIGS. 4 and 5 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 4 and 5. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIGS. 4 and 5 show a flow block diagram illustrating an example of a process 400 for providing a map (e.g., mapping information 55) of a mapped area (e.g., mapped area 7) to a mobile device (e.g., mobile device 10) of a user (e.g., user 5), in accordance with aspects of the present disclosure. At 401, a system (e.g., mapping and navigation system 20 executing messaging module 209) receives one or more messages (e.g., message 50) from a messaging application (e.g., messaging application 205) of the mobile device requesting location services. In some implementations, receiving the message includes automatically detecting a request for location and routing information in a messaging session (e.g., messaging session 221). For example, as detailed previously, the system (e.g., using chatbot 225) can determine that the message constitutes a request for location and routing information based on predetermined words or phrases in the message.

At 403, the system (e.g., using information extraction module 241) can obtain location information for the one or more messages received at 401. In some implementations, the one or more messages received at 401 may include all the information used by the system to determine a unique identifier of a mobile device of the user, a current location of the mobile device, a destination of the user, and a route therebetween. In other implementations, the system can interactively interview the user using to obtain such information. Obtaining the location at 403 can include, at 407 requesting a location identifier of the sign near the user's current location. For example, the computing system (e.g., using chatbot 225) may generate a message to requesting that the user provide a location identifier of sign (e.g., sign 33A) near the user's current location. At 411, the computing system may receive information identifying the user's current location (e.g., "33A") in response to the request sent at 407. Additionally, obtaining the location at 403 can include, at 415, requesting that the user identify a destination (e.g., destination 39). For example, the computing system (e.g., using chatbot 225) may generate a message requesting that the user provide a location identifier of the destination (e.g., "please let me know where you are headed"). At 419, the computing system may receive information identifying the user's destination (e.g., "cafeteria") in response to the request sent at 415. If the destination does not correspond to any of the predetermined location in the mapped area (e.g., there is no cafeteria), then the computing system can interact with the user to identify a location stored by the system.

At 423, the system (e.g., executing location determination module 243) determines the user's location based on the location identifier obtained at 403. Determining the user's location can include, at 425, retrieving a pre-stored location (e.g., coordinates) corresponding to the location identifier of the signage (e.g., sign 33A). At 427, the system (e.g., executing destination determination module 427) determines the user's destination. In some implementations, the system determines the destination based on the destination identifier obtained at 403. In some implementations, the system determines the destination based on pre-stored user information (e.g., user information 366), which can identify a date, time, and location of an appointment. For example, the user information can reference an electronic health record providing details of a doctor's appointment in the mapped area. Determining the user's destination can include, at 429, retrieving a pre-stored destination (e.g., coordinates) corresponding to the destination identifier (e.g., sign 33A).

At 431, the system may determine a mobile device identifier of the mobile device (e.g., a MAC address). In some implementations, the mobile device may provide the mobile device identifier along with the messages received at 401. In other implementations, the system determines the mobile device identifier using information maintained by the wireless access points (e.g., wireless access points 35). In some implementations, at 435, the system can determine the wireless access point (e.g., wireless access point 35A corresponding to the location of the user determined at 423, and, at 439, the system can determine the mobile device identifier of the mobile device sending wireless signals (e.g., wireless signal 59A, such as a probe request) to the wireless access point determined at 435. The system can receive the wireless signal information from the mobile device or from the wireless access point. In some implementations, the system can distinguish the mobile device identifier of the user's mobile device from others connected to the wireless access point by comparing it a mobile device identifier received with the message at 401. For example, the mobile device may be located near one of several wireless access points. As such, it follows that the user is also near a corresponding one of the signs. Using a background Wi-Fi process, the mobile device may periodically or continuously send probe requests to identify which of the wireless access points that may provide an improved Wi-Fi connection to the mobile device. The closest wireless access point having a strongest signal may match a timestamp of the probe request and the mobile device identifier of the mobile device received by the wireless access point in the text message sent by the user (which should include the sign's identifier), which allows the system to determine the mobile device identifier of the mobile device. Subsequently, the system can track the mobile device identifier to provide persistent, contextual text messages about the user's location can be exchanged without the need for a data connection (e.g., SMS)

Continuing the process 400 in FIG. 5, as indicated by reference connector "A," at 501, the system (e.g., executing route determination module) determines mapping and navigation information (e.g., a path) routing the user from the location of the user determined at 423 to the destination determined at 427. At 503, the system (e.g., execution map generation module 247) generates a map image including iconology indicating the current location of the user determined at 423, the destination obtained at 427, and the route determined at 501. At 505, the system (e.g., executing messaging module 249) provides the mapping and navigation information determined at 501 to the mobile device in response to the message received at 401 from the messaging application of the mobile device. In implementations, the mapping and navigation information includes the map generated at 503.

The system can track the location of the mobile device as the user moves through the mapped area from the original location determined at 427 in route to the destination. At 507, the system can wait a predetermined period of time before determining an updated location of the user (e.g., 15 seconds, 30 seconds, or one minute). At 509, the system (e.g., executing location determination module 243) can determine an updated location of the mobile. In implementations, doing so involves passively tracking the mobile device using the wireless access points. Additionally or alternatively, the system can passively track the user using image-based tracking techniques. For example, cameras located in the mapped area can passively track the user using facial recognition.

In some implementations, determining the updated location at 509 can include, at 513, determining wireless access points receiving wireless signals (e.g., wireless signals 59, such as probe requests) from the mobile device based on the mobile device identifier determined at 431. For example, the system can track the mobile device using passive Wi-Fi. At 517, the system can determine the signal strengths of the wireless signals (e.g., signal strengths 61) received by the wireless access points determined at 513. At 521, the system can determine the updated location of the mobile device by comparing the relative signal strengths of the wireless signals determined at 517. For example, the system can estimate that user has departed a first wireless access point (e.g., wireless access point 35A) and is approaching a second wireless access point (e.g., wireless access point 35B) by comparing the signal strength of a probes signals sent to the first and second wireless points. The updated information determined at 521 can be combined with other location information obtained by the mobile device (e.g., GPS information and inertial navigation information), which may be shared by the mobile device with the system during a messaging session (e.g., messaging session 221). In some implementations, the system can use alternative methods of determining the current location of the user. For example, if the system is unable to determine that the user is at a location near a particular sign based on communication between the mobile device and a wireless access point, then the system can communicate with the user to clarify the user's location. In some cases, the clarification can be communicated through a SMS, MMS, or chat massage, through telephone (e.g., using an automated voice response unit), or through a mobile robot dispatched to the user to assist them in navigating to their destination. Further, in some implementations, in response to receiving a message from the user asking for assistance with directions, and an employee or robot having an instance of the mapping and navigation system may be dispatched to the location of the user and may reuse the map information generated from the system to navigate to the user and lead the user to the destination.

At 525, the system (e.g., executing map generation module 247) can generate updated mapping and navigation information, including a map with updated iconology indicating the current location of the user along the route to the destination determined at 443. At 529, the system (e.g., executing messaging module 249) can send a message including the mapping and navigation information to the messaging application of the mobile device. At 533, the system can determine whether the updated location is approximated or absolutely the same as the destination location. If at 533 it is determined that the updated location is approximately or absolutely the same as the destination location, then the process 400 ends. If at 533, the updated location is not approximately or absolutely the same as the destination location, then the system can return to 505 and iteratively determine an updated location of the user until the user reaches the destination.

While the process 400 is described above as providing mapping and navigation information to users using a mobile device and wireless access points, it is understood that the process 400 may be used in combination with other technologies, such as facial recognition and image tracking. In some implementations, proximity detectors and imaging devices can be positioned at locations throughout a mapped area (e.g., combined signs 33 and/or wireless access points 35, or attached to robots, drones, or heads-up-display of a customer service representative). Using such proximity detectors and imaging devices the mapping and navigation system can identify the user and track them through the mapped area. For example, when the system receives a message from the user at 401, user information captured by the proximity detectors and imaging devices can be associated with the message information (e.g., name and MAC address of the mobile device 10). Such information can be used by other proximity detectors and imaging devices to identify and track the user as the user traverses the mapped area, as described in 509.

Additionally, in some implementations, the system may lead or transport the user to the destination. For example, using the request for location services at 401, location information obtained at 403 and 423, and destination information determined at 427, an automated transport device (e.g., a drone or a wheelchair) may be dispatched to the user. Such device may communicatively connect to the user's mobile device to access incoming information (e.g., map information 55) about where the user is supposed to go from the user's phone. Using such information, the transport device may automatically transport the mobile device and/or the user to the destination. As such, the user may follow the automated transport device or be carried by the automated transport device to the user's destination.

Figure 6:
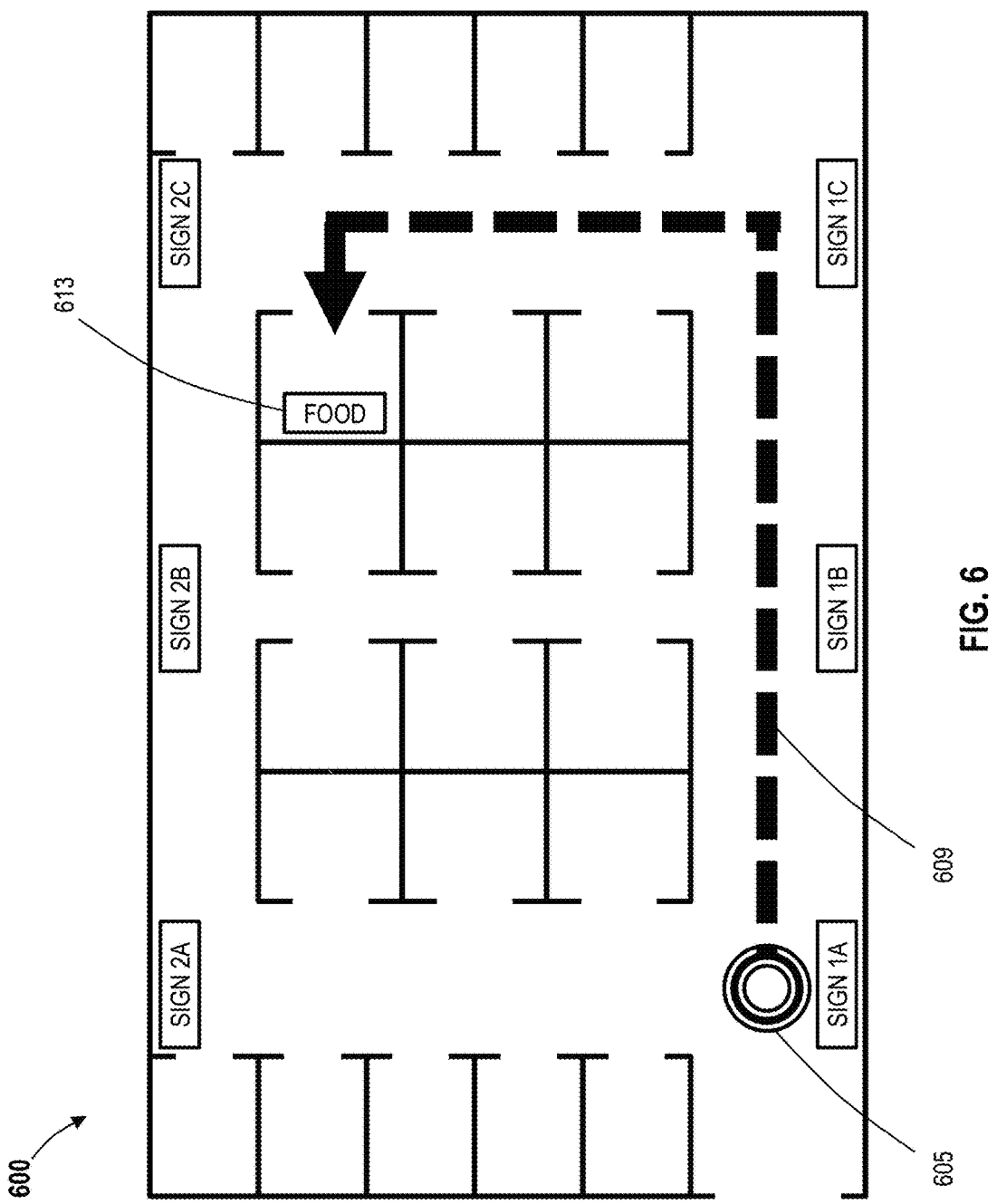
FIG. 6 shows a diagram illustrating an example of map display in accordance with aspects of the present disclosure.
Figure 7:
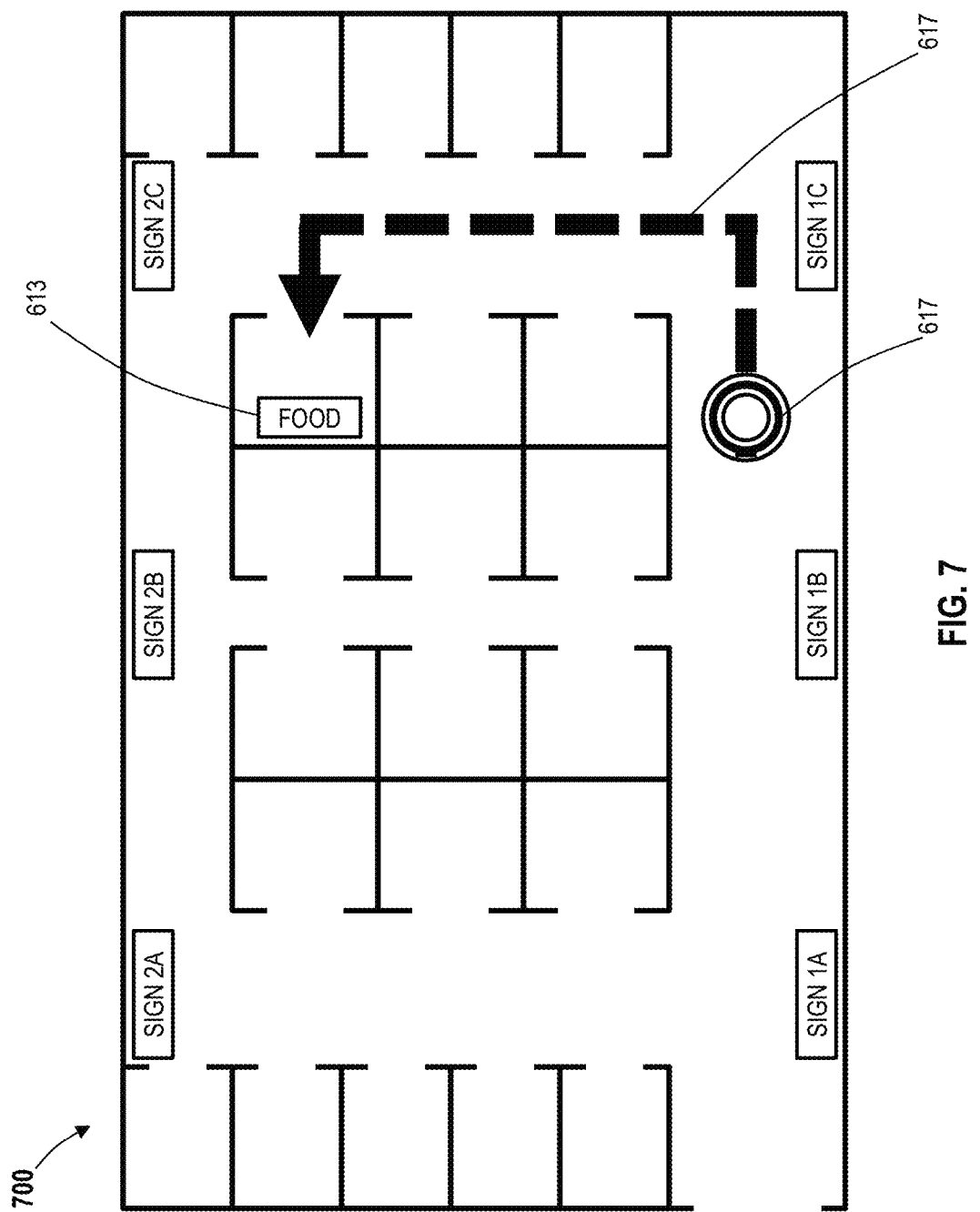
FIG. 7 shows a diagram illustrating an example of map display in accordance with aspects of the present disclosure.
Figure 8:
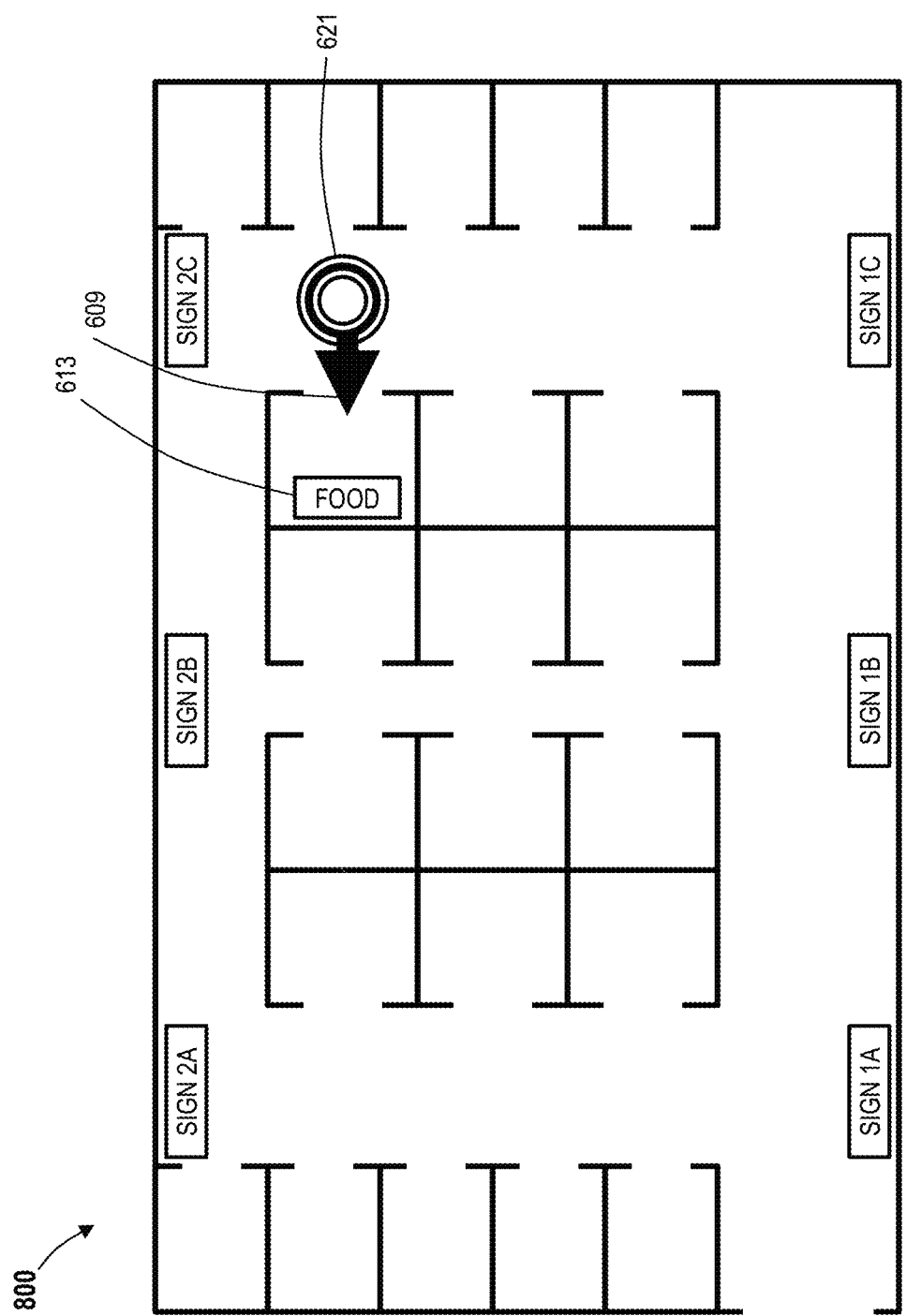
FIG. 8 shows a diagram illustrating an example of map display in accordance with aspects of the present disclosure.

FIGS. 6-8 illustrate examples of maps (e.g., maps 55) provided to a mobile device (e.g., mobile device 10) of a user (e.g., user 5), in accordance with implementations of the present disclosure. FIG. 6 shows a map 600 displaying an icon 605 depicting an initial location of the user and icons 609 depicting a route from the initial location to an icon 613 depicting the destination. FIG. 7 shows an icon 617 depicting an updated location of the user and icons 609 depicting the route from an updated location to icon 613 depicting the destination. FIG. 8 shows an icon 621 depicting an updated location of the user along the icons 609 depicting a second updated location at the end of the route 609 located substantially or absolutely at to the icon 613 depicting the destination.

FIG. 9 shows a table depicting an example of a data structure 900 that contains wireless access point information 355, in accordance with implementations of the present disclosure. The wireless access point information 355 can associate a wireless access point identifier 905 (e.g., 35A) with a wireless access point location 909 within a mapped area (e.g., coordinates within mapped area 7), a corresponding sign identifier 913 (e.g., sign 33A), a sign location 917 (e.g., coordinates within mapped area 7). Based on the wireless access point information 355 stored in table 900, systems and methods disclosed herein can determine a location of a user based on sign identification information provided by the user (e.g., FIG. 4, 423).

FIG. 10 shows a table depicting an example of a data structure 1000 that contains wireless destination information 357, in accordance with implementations of the present disclosure. The destination information 357 can include, a destination name 1005, a destination location 1009 in the mapped area, and one or more wireless access points 1013 and 1017. Based on the destination name 1005, systems and methods disclosed herein can a route to the destination location 1009 (e.g., FIG. 4, 443).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A mapping and navigation system comprising:
    a processor; and
    one or more computer-readable data storage devices storing program instructions that when executed by the processor, control the mapping and navigation system to perform operations comprising:
        receiving, via a network, one or more messages from a messaging application of a mobile device of a user requesting a map of a mapped area;
        generating the map of the mapped area displaying an icon indicating a location of the user; and
        sending, via the network, the map to the messaging application of the mobile device for display within the messaging application, wherein the messaging application is not a mapping application of a mapping and navigation service.

2. The mapping and navigation system of claim 1, wherein:
    the mapping and navigation system further comprises a messaging module configured to communicate with the user through the messaging application; and
    the messaging application is a text messaging application or a chat application.

3. The mapping and navigation system of claim 2, wherein the messaging application is not a mapping application of a mapping and navigation service.

4. The mapping and navigation system of claim 2, wherein the mobile device lacks any mapping and navigation application configured to communicate with the mapping and navigation system.

5. The mapping and navigation system of claim 1, wherein the one or more messages include a predetermined identifier obtained from one of a plurality of location signs in the mapped area.

6. The mapping and navigation system of claim 1, wherein the operations further comprise:
    obtaining an identifier of a first sign of a plurality of signs at the mapped area from the one or more messages; and
    determining the location of the user based on a predetermined location of the first sign.

7. The mapping and navigation system of claim 1, wherein the operations further comprise:
    obtaining an identifier of a first destination of a plurality of destinations at the mapped area from the one or more messages; and
    determining a route through the mapped area from the location of the user to the first destination.

8. The mapping and navigation system of claim 7, wherein generating the map of the mapped area comprises generating the map with iconology indicating the route from the location of the user to a first destination.

9. The mapping and navigation system of claim 8, wherein the operations further comprise:
    passively determining a current location of the mobile device in the mapped area;
    generating an updated map of the mapped area displaying updated iconology indicating a route from the current location of the user to the first destination; and
    sending the updated map to the messaging application of the mobile device.

10. The mapping and navigation system of claim 9, wherein passively determining the current location of the mobile device in the mapped area comprises determining the current location based on signal strengths of one or more wireless signals communicated between the mobile device and wireless access points of the network.

11. The mapping and navigation system of claim 1, wherein the operations further comprise:
   obtaining appointment information of the user, the appointment information including a location, time, and date of an appointment of the user;
   obtaining an identifier of the location of the appointment at the mapped area; and
   determining a route through the mapped area from the location of the user to the location of the appointment.

12. A method comprising:
   receiving, by a computing device, via a network, one or more messages from a messaging application of a mobile device of a user requesting a map of a mapped area;
   generating, by the computing device, the map of the mapped area displaying an icon indicating a location of the user; and
   sending, by the computing device, via the network, the map to the messaging application of the mobile device for display within the messaging application, wherein the messaging application is not a mapping application of a mapping and navigation service.

13. The method of claim 12, wherein the messaging application is a text messaging application or a chat application.

14. The method of claim 13, wherein the messaging application is not a mapping and navigation application of a mapping and navigation service.

15. The method of claim 13, wherein the mobile device lacks any mapping and navigation application configured to communicate with the mapping and navigation system.

16. The method of claim 13, further comprising:
   obtaining appointment information of the user, the appointment information including a location, time, and date of an appointment of the user;
   obtaining an identifier of the location of the appointment at the mapped area; and
   determining a route through the mapped area from the location of the user to the location of the appointment.

17. The method of claim 12, wherein the one or more messages include a predetermined identifier obtained from one of a plurality of location signs in the mapped area.

18. The method of claim 12, wherein the operations further comprise:
   obtaining an identifier of a first sign of a plurality of signs at the mapped area from the one or more messages; and
   determining the location of the user based on a predetermined location of the first sign.

19. The method of claim 12, wherein the operations further comprise:
   obtaining an identifier of a first destination of a plurality of destinations at the mapped area from the one or more messages; and
   determining a route through the mapped area from the location of the user to the first destination.

20. The method of claim 19, wherein generating the map of the mapped area comprises generating the map with iconology indicating the route from the location of the user to the first destination.

21. The method of claim 20, wherein the operations further comprise:
   passively determining a current location of the mobile device in the mapped area;
   generating an updated map of the mapped area displaying updated iconology indicating a route from the current location of the user to the first destination; and
   sending the updated map to the messaging application of the mobile device.

22. The method of claim 21, wherein passively determining the current location of the mobile device in the mapped area comprises determining the current location based on signal strengths of one or more wireless signals communicated between the mobile device and wireless access points of the network.

* * * * *